United States Patent
Kobata et al.

(10) Patent No.: US 11,764,634 B2
(45) Date of Patent: Sep. 19, 2023

(54) FAN MOTOR WATERPROOF STRUCTURE

(71) Applicant: DAIKIN INDUSTRIES, LTD., Osaka (JP)

(72) Inventors: Teppei Kobata, Osaka (JP); Jun Ishimaru, Osaka (JP); Takayuki Hatakeyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 119 days.

(21) Appl. No.: 17/311,919

(22) PCT Filed: Nov. 7, 2019

(86) PCT No.: PCT/JP2019/043608
§ 371 (c)(1),
(2) Date: Jun. 8, 2021

(87) PCT Pub. No.: WO2020/121698
PCT Pub. Date: Jun. 18, 2020

(65) Prior Publication Data
US 2022/0029499 A1    Jan. 27, 2022

(30) Foreign Application Priority Data
Dec. 10, 2018 (JP) .................. 2018-230915

(51) Int. Cl.
H02K 5/10    (2006.01)
H02K 5/124   (2006.01)
H02K 7/14    (2006.01)

(52) U.S. Cl.
CPC .............. *H02K 5/10* (2013.01); *H02K 5/124* (2013.01); *H02K 7/14* (2013.01)

(58) Field of Classification Search
CPC . H02K 5/10; H02K 7/14; H02K 5/124; F02D 29/10
USPC ............................................... 310/62, 63, 88
See application file for complete search history.

(56) References Cited

U.S. PATENT DOCUMENTS

2006/0181247 A1    8/2006  Marukawa et al.
2017/0279332 A1    9/2017  Urabe et al.

FOREIGN PATENT DOCUMENTS

| CN | 2229566 Y | * | 6/1996 |
| CN | 103742430 A | * | 4/2014 |
| JP | 54-180210 U | | 12/1979 |
| JP | 62-21750 U | | 2/1987 |

(Continued)

OTHER PUBLICATIONS

International Preliminary Report of corresponding PCT Application No. PCT/JP2019/043608 dated Jun. 24, 2021.

(Continued)

*Primary Examiner* — Jose A Gonzalez Quinones
(74) *Attorney, Agent, or Firm* — Global IP Counselors, LLP

(57) ABSTRACT

A fan motor waterproof structure includes a fan motor, a disk-shaped member, and a tubular member. The fan motor is arranged with a shaft projecting upward from a motor body. The a disk-shaped member is fitted to an outside of a projecting portion of the shaft of the fan motor on a motor body side. The tubular member is press-fitted onto the disk-shaped member and disposed on an outer periphery of the shaft. The tubular member covers a boundary between an upper surface of the disk-shaped member and the shaft.

3 Claims, 8 Drawing Sheets

(56) References Cited

FOREIGN PATENT DOCUMENTS

JP     2014-107909 A     6/2014
JP        6320555 B2     4/2018

OTHER PUBLICATIONS

European Search Report of corresponding EP Application No. 19 89 6498.3 dated Nov. 26, 2021.
International Search Report of corresponding PCT Application No. PCT/JP2019/043608 dated Dec. 24, 2019.

\* cited by examiner

FAN MOTOR WATERPROOF STRUCTURE

CROSS-REFERENCE TO RELATED APPLICATIONS

This U.S. National stage application claims priority under 35 U.S.C. § 119(a) to Japanese Patent Application No. 2018-230915, filed in Japan on Dec. 10, 2018, the entire contents of which are hereby incorporated herein by reference.

BACKGROUND

Field of the Invention

The present disclosure relates to a fan motor waterproof structure.

Background Information

Conventionally, as a fan motor waterproof structure, there is a mold electric motor in which a rotor shaft, a waterproof cap, and an E-ring are assembled (see, for example, JP 6320555 B2).

In the above-described mold electric motor, the waterproof cap prevents water's entering a motor body from between the shaft and the motor body.

SUMMARY

However, when the above-described mold electric motor is placed such that the shaft protrudes upward, there is a problem that the shaft is corroded due to accumulation of dust and water at an interface between an exposed portion of the shaft and the waterproof cap. In the above-described mold electric motor, when the shaft is corroded, waterproofness between the shaft and the waterproof cap is lost, and water enters the motor body along the shaft, which may cause damage of components inside the motor body, such as a shaft bearing, due to the entering water.

The present disclosure proposes a fan motor waterproof structure that can improve waterproofness of a fan motor.

A fan motor waterproof structure of the present disclosure includes:

a fan motor arranged with a shaft projecting upward from a motor body;

a disk-shaped member fitted to an outside of a projecting portion of the shaft of the fan motor on the motor body side; and a tubular member press-fitted onto the disk-shaped member and on an outer periphery of the shaft, tubular member covering a boundary between an upper surface of the disk-shaped member and the shaft.

According to the present disclosure, by fitting the disk-shaped member on the outside of the projecting portion of the shaft of the fan motor on the motor body side, and press-fitting the tubular member onto the disk-shaped member and on the outer periphery of the shaft to cause the tubular member configured to cover the boundary between the upper surface of the disk-shaped member and the shaft, it is possible to prevent accumulation of dust and water at the interface between the exposed portion of the shaft and the disk-shaped member. This can improve the waterproofness of the fan motor.

Further, in the fan motor waterproof structure according to one aspect of the present disclosure, a space is formed between the disk-shaped member and the tubular member, and the space is connected to an open space on a radially outer side of the fan motor waterproof structure.

According to the present disclosure described above, the space formed between the disk-shaped member and the tubular member makes it possible to prevent radially inward infiltration, due to a capillary phenomenon, of water that has entered between the disk-shaped member and the tubular member from outside. Further, the space formed between the disk-shaped member and the tubular member is connected to the open space on the radially outer side, which causes water having been blocked from entering in the space between the disk-shaped member and the tubular member to be discharged outside along with rotation of the shaft, and to be prevented from accumulating between the disk-shaped member and the tubular member.

Further, in the fan motor waterproof structure according to one aspect of the present disclosure, individual end faces of the disk-shaped member and the tubular member face each other with the space interposed in between, and have a plurality of faces having different heights, and at least one face of the plurality of faces of the disk-shaped member is located above at least one face of the plurality of faces of the tubular member.

According to the present disclosure described above, individual end faces of the disk-shaped member and the tubular member facing each other with the space interposed in between have a plurality of faces having different axial heights of the shaft, which forms a maze between the disk-shaped member and the tubular member to make it possible to effectively prevent water from entering between the disk-shaped member and the tubular member.

Further, in the fan motor waterproof structure according to one aspect of the present disclosure, a flange part is provided at a lower end of the tubular member.

According to the present disclosure, providing the flange part at the lower end of the tubular member enables the boundary between the upper surface of the disk-shaped member and the shaft to be reliably covered with the flange part, and the waterproofness is further improved.

Further, in the fan motor waterproof structure according to one aspect of the present disclosure, a flange part is provided at a lower end of the tubular member, an annular first protrusion protruding upward is provided on an upper surface and an inner peripheral side of the disk-shaped member, an annular second protrusion protruding downward is provided on a lower surface and an outer peripheral side of the flange part of the tubular member, and a labyrinth seal is formed by the annular first protrusion of the disk-shaped member and the annular second protrusion of the tubular member.

According to the present disclosure, it is possible to effectively prevent water from entering between the disk-shaped member and the tubular member, by the labyrinth seal formed by the annular first protrusion protruding upward on the upper surface and the inner peripheral side of the disk-shaped member and the annular second protrusion protruding downward on the lower surface and the outer peripheral side of the flange part of the tubular member.

Further, in the fan motor waterproof structure according to one aspect of the present disclosure, a taper is formed on an upper end of the tubular member to gradually decrease from an inner peripheral side to an outer peripheral side.

According to the present disclosure, by forming the taper on the upper end of the tubular member to gradually decrease from the inner peripheral side to the outer peripheral side, it is possible to prevent accumulation of dust and water at the upper end of the tubular member, and to reduce risk of water entering between the tubular member and the shaft from the upper end side of the tubular member.

DETAILED DESCRIPTION OF EMBODIMENT(S)

Figure 1:
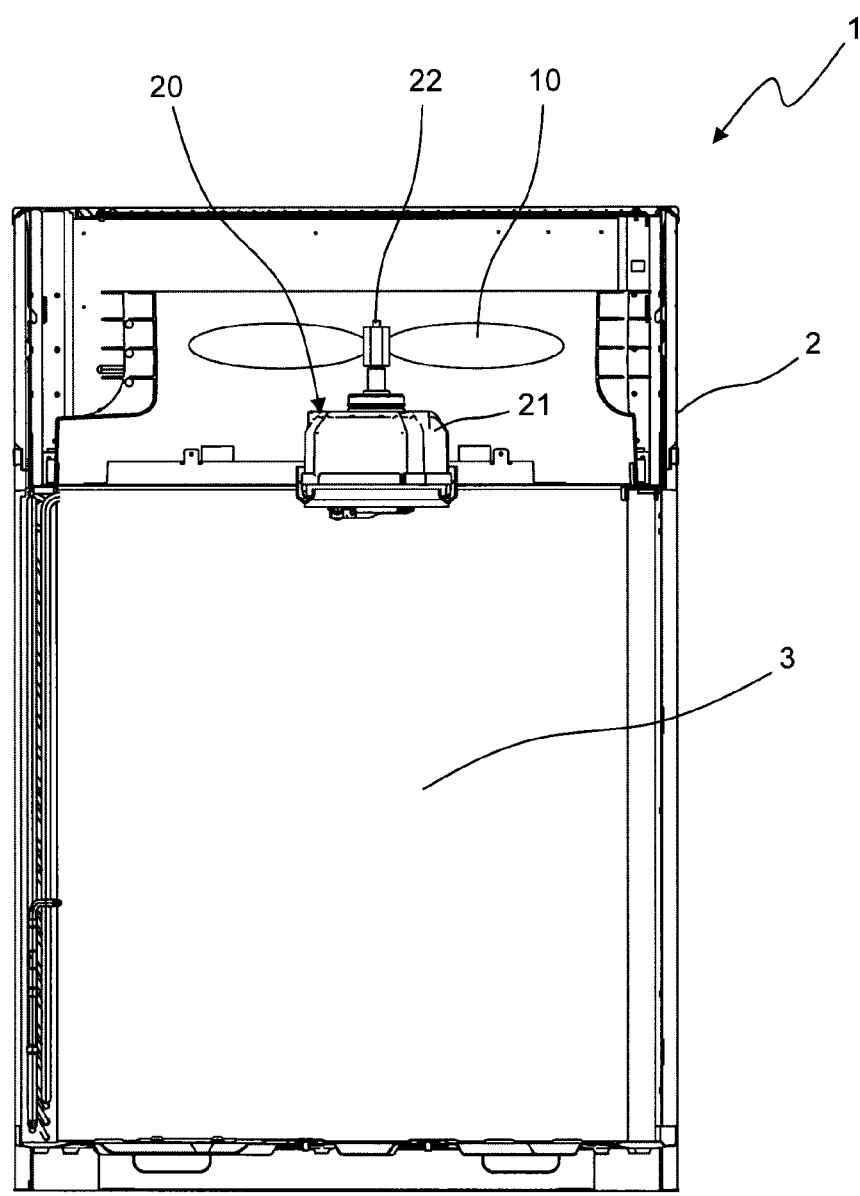
FIG. 1 is a vertical cross-sectional view of an outdoor unit using a fan motor waterproof structure of a first embodiment of the present disclosure.

Hereinafter, embodiments will be described. Note that, in the drawings, identical reference signs represent identical or corresponding parts. In addition, the dimensions on the drawings such as a length, a width, a thickness, and a depth are appropriately changed from the actual scale for the purpose of clarifying and simplifying the drawings, and do not represent the actual relative dimensions.

First Embodiment

FIG. 1 is a vertical cross-sectional view of an outdoor unit 1 using a fan motor waterproof structure of a first embodiment of the present disclosure. The outdoor unit 1 forms a part of a refrigerator or an air conditioner.

As shown in FIG. 1, the outdoor unit 1 of the first embodiment includes a rectangular parallelepiped casing 2, a heat exchanger 3 arranged in the casing 2, and a fan motor 20 arranged in the casing 2 and above the heat exchanger 3. The fan motor 20 is arranged such that a shaft 22 projects upward from a motor body 21. To the shaft 22 of the fan motor 20, a fan 10 is attached.

Figure 2:
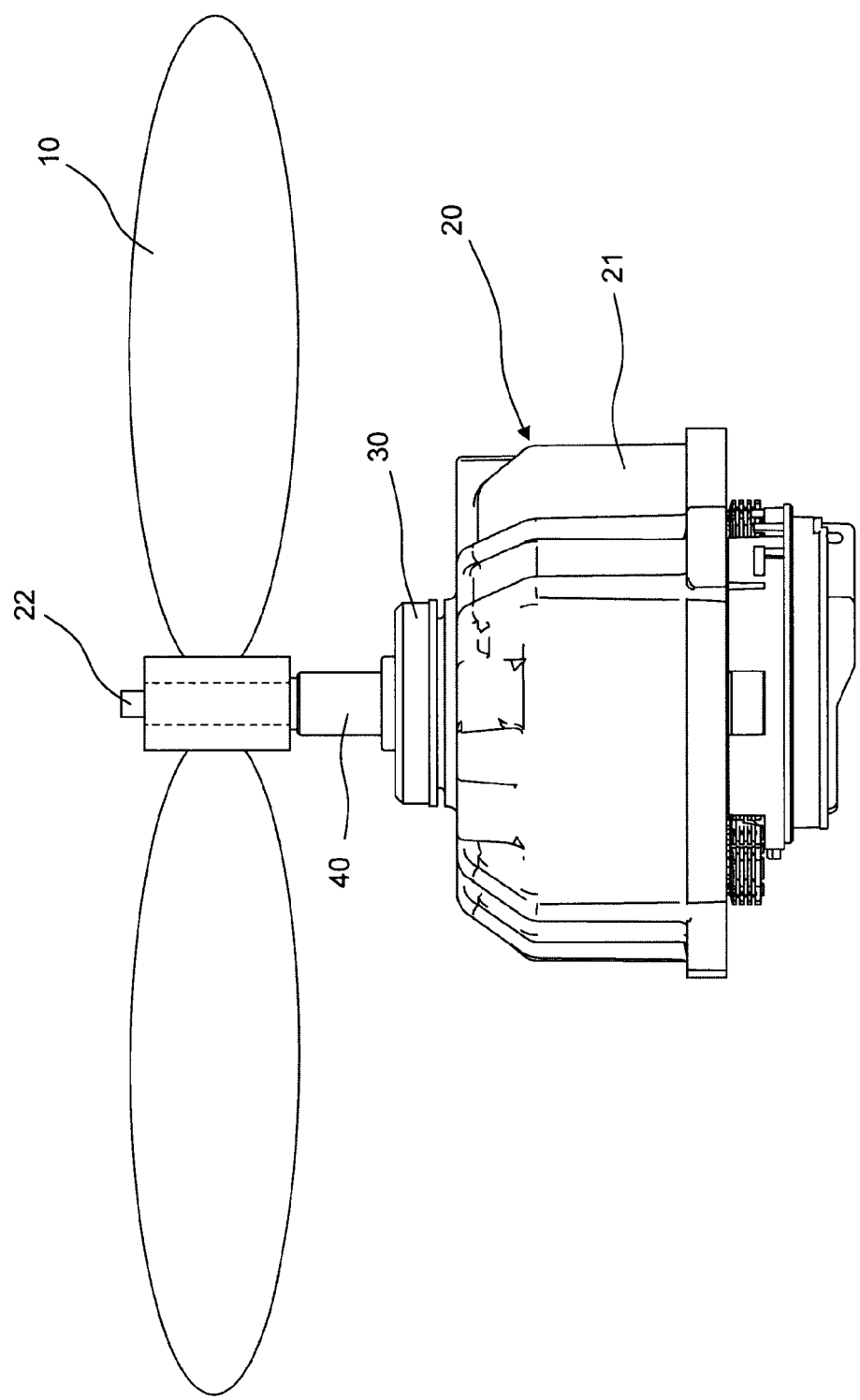
FIG. 2 is a side view of a fan and a fan motor of the outdoor unit.

FIG. 2 is a side view of the fan 10 and the fan motor 20 of the outdoor unit 1. As shown in FIG. 2, on an outside of a projecting portion of the shaft 22 of the fan motor 20 on the motor body 21 side, a disk-shaped draining rubber 30 is fitted. The draining rubber 30 is an example of a disk-shaped member, and is made of ethylene propylene diene rubber (EPDM) or the like.

Further, on the draining rubber 30 and on an outer periphery of the shaft 22, a tubular waterproof cap 40 is press-fitted to cover a boundary between an upper surface of the draining rubber 30 and the shaft 22. The waterproof cap 40 is an example of a tubular member, and is made of ethylene propylene diene rubber (EPDM) or the like.

Figure 3:
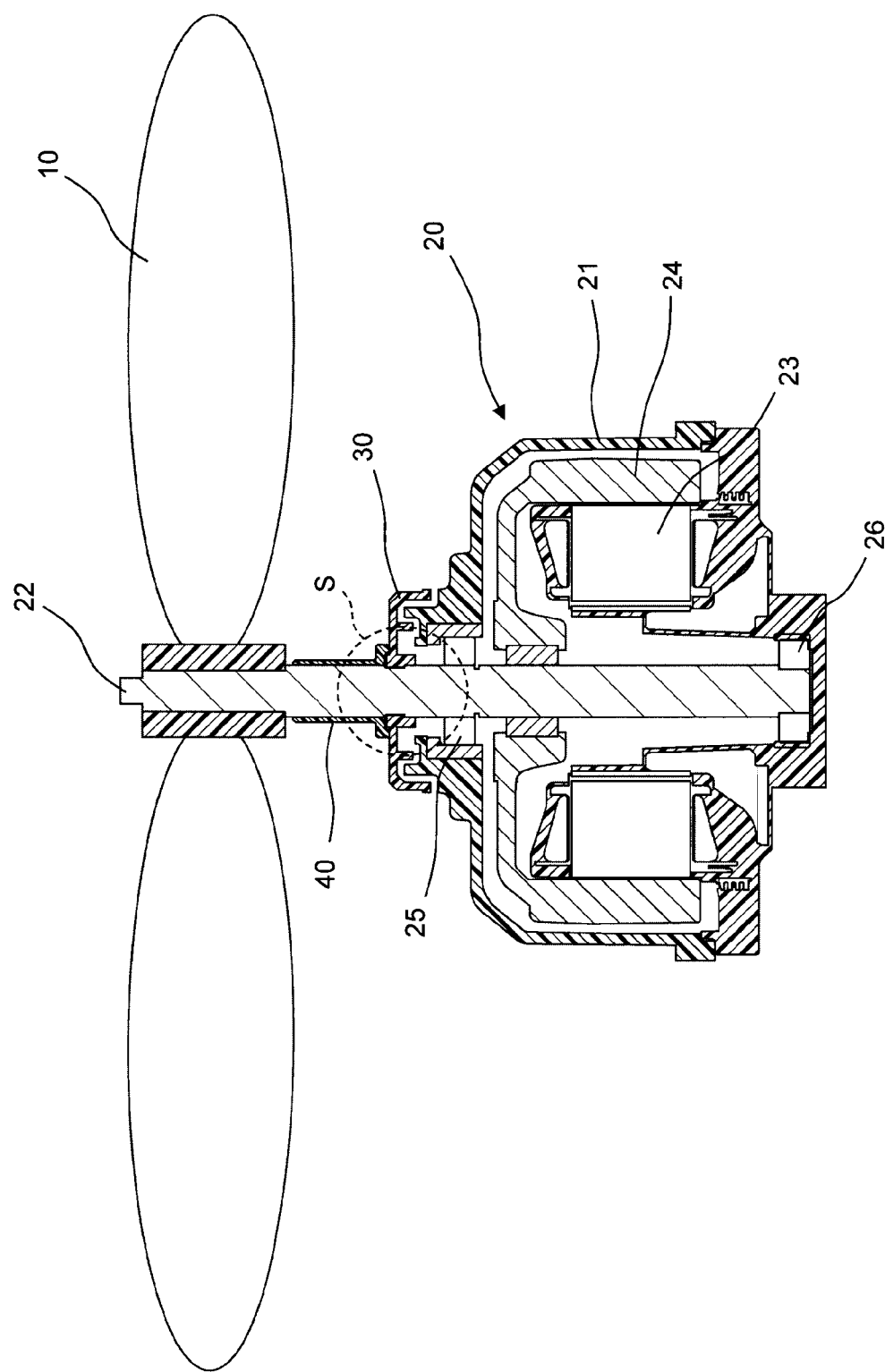
FIG. 3 is a cross-sectional view of the fan and the fan motor.

Further, FIG. 3 is a cross-sectional view of the fan 10 and the fan motor 20. As shown in FIG. 3, in the motor body 21, an annular stator 23 is arranged. To the shaft 22, a tubular rotor 24 arranged in the motor body 21 and on an outer peripheral side of the stator 23 is fixed. The shaft 22 is rotatably supported by bearings 25 and 26 arranged in the motor body 21.

Figure 4:
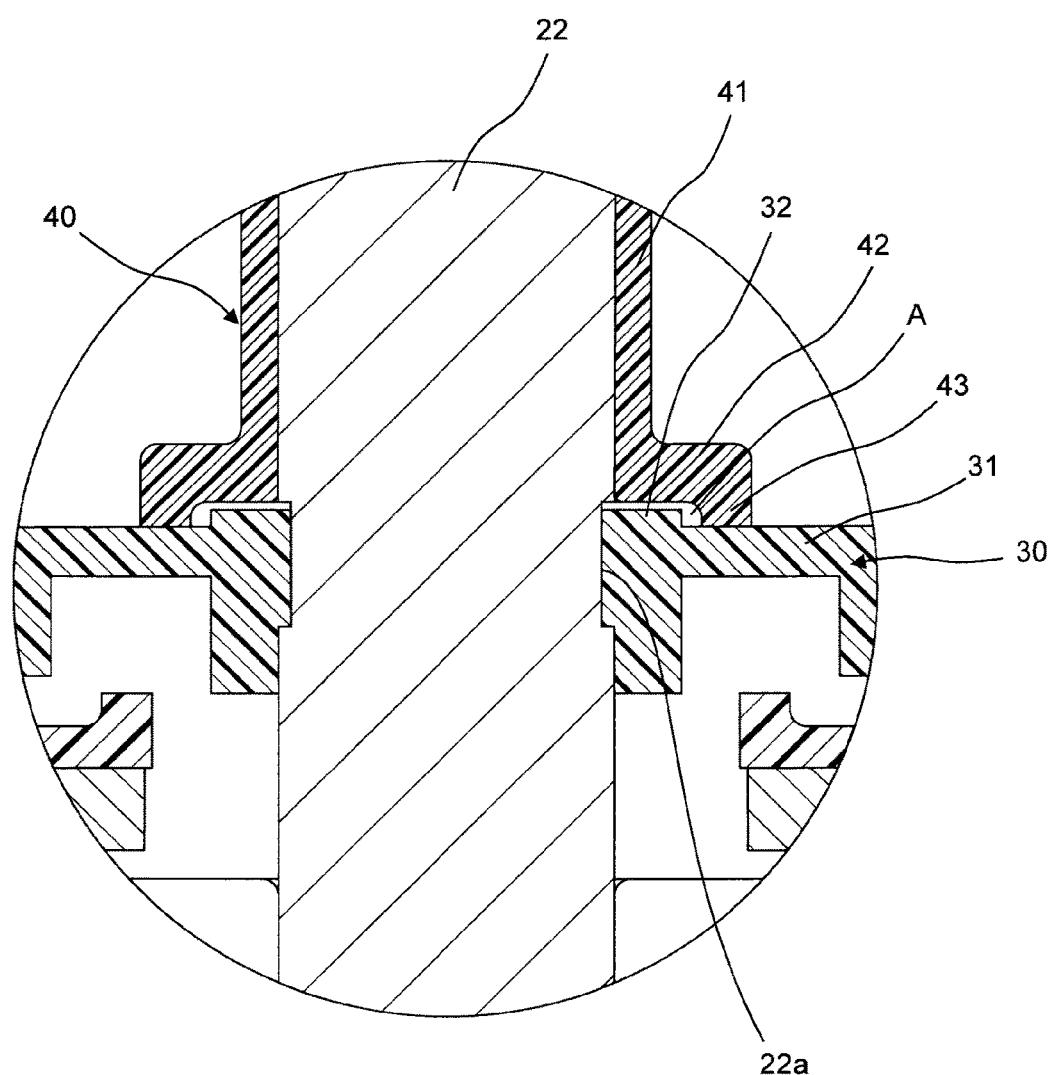
FIG. 4 is an enlarged cross-sectional view of a main part of the fan motor.

FIG. 4 is an enlarged cross-sectional view of a main part of the fan motor 20 (a region S surrounded by a dotted line shown in FIG. 3). As shown in FIG. 4, an inner peripheral side of the draining rubber 30 is fitted into an annular step part 22a provided on the shaft 22. On the upper surface and the inner peripheral side of the draining rubber 30, an annular first protrusion 32 protruding upward is provided.

Further, the waterproof cap 40 has a cylindrical portion 41, a flange part 42 provided at a lower end of the cylindrical portion 41 so as to extend outward, and an annular second protrusion 43 provided so as to protrude downward on a lower surface and an outer peripheral side of the flange part 42.

By the annular first protrusion 32 of the draining rubber 30 and the annular second protrusion 43 of the waterproof cap 40, a labyrinth seal is formed. Further, a space A is formed between the draining rubber 30 and the waterproof cap 40.

A lower end face of the annular second protrusion 43 of the waterproof cap 40 is in contact with the upper surface of a base part 31 of the draining rubber 30.

Figure 5:
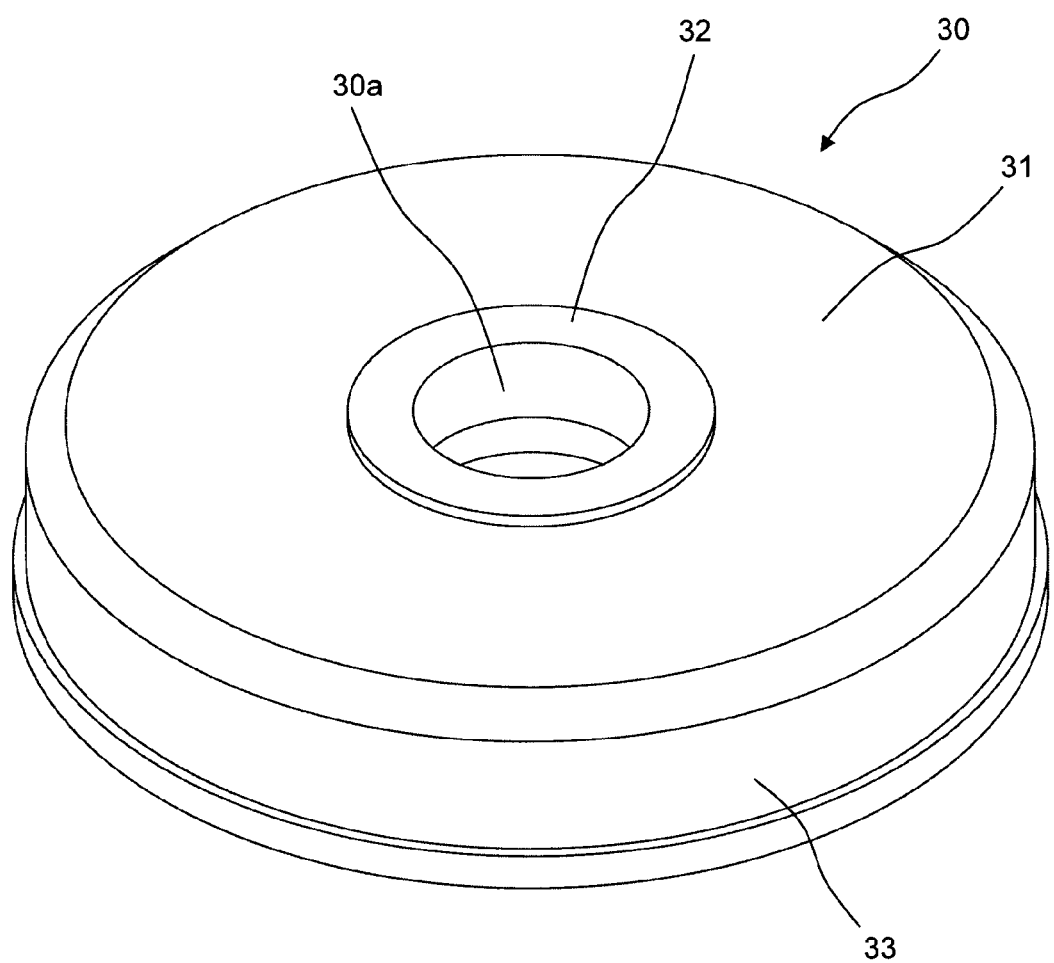
FIG. 5 is a perspective view of a draining rubber viewed from diagonally above.

FIG. 5 is a perspective view of the draining rubber 30 viewed from diagonally above. As shown in FIG. 5, the draining rubber 30 has the disk-shaped base part 31 provided with a circular hole 30a into which the shaft 22 is inserted, the annular first protrusion 32 provided so as to protrude upward on the inner peripheral side of the base part 31, and a cylindrical portion 33 provided so as to extend downward on an outer peripheral side of the base part 31.

Figure 6:
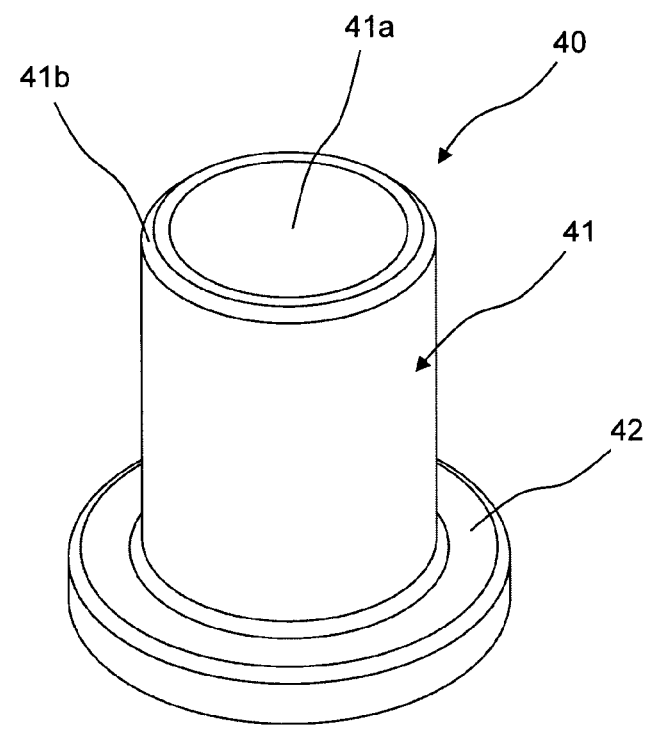
FIG. 6 is a perspective view of a waterproof cap viewed from diagonally above.
Figure 7:
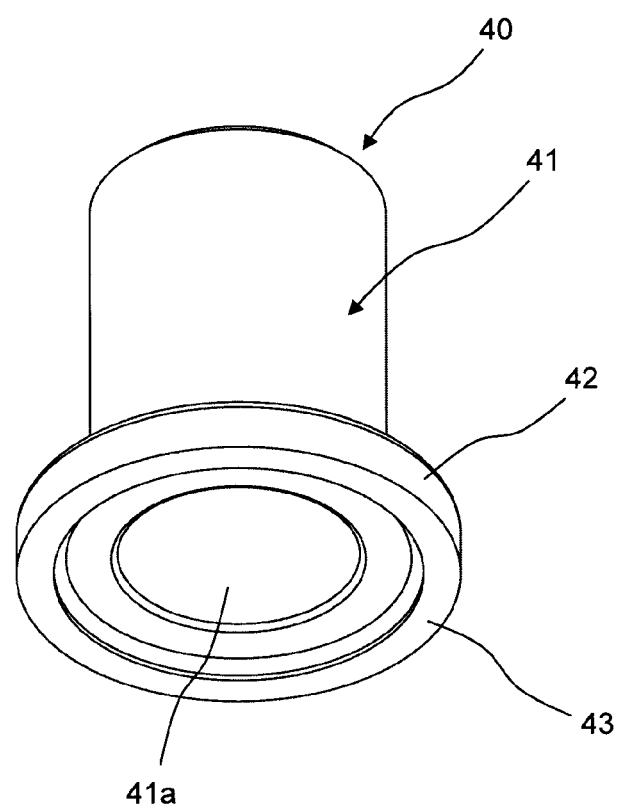
FIG. 7 is a perspective view of the waterproof cap viewed from diagonally below.

FIG. 6 is a perspective view of the waterproof cap 40 viewed from diagonally above, and FIG. 7 is a perspective view of the waterproof cap 40 viewed from diagonally below. As shown in FIGS. 6 and 7, the cylindrical portion 41 of the waterproof cap 40 has a hole 41a through which the shaft 22 penetrates. Further, the flange part 42 is provided at a lower end of the cylindrical portion 41 so as to extend outward. Further, the annular second protrusion 43 is provided so as to protrude downward on the lower surface and the outer peripheral side of the flange part 42.

At an upper end of the cylindrical portion 41 of the waterproof cap 40, a taper 41b is formed so as to gradually decrease from an inner peripheral side to an outer peripheral side.

According to the fan motor waterproof structure having the above configuration, by press-fitting the waterproof cap 40 (the tubular member) on the draining rubber 30 (the disk-shaped member) and on the outer periphery of the shaft 22, to cause the waterproof cap 40 to cover the boundary between the upper surface of the draining rubber 30 and the shaft 22, it is possible to prevent dust and water from accumulating at an interface between an exposed portion of the shaft 22 and the draining rubber 30. This can improve the waterproofness of the fan motor 20. Therefore, it is possible to prevent corrosion of the shaft 22 and entering of water into the motor body 21 along the shaft 22, and to prevent damage of the bearing and the like by the entering water.

Further, the space A formed between the draining rubber 30 and the waterproof cap 40 makes it possible to prevent radially inward infiltration, due to the capillary phenomenon, of the water having entered between the draining rubber 30 and the waterproof cap 40 from outside.

In addition, providing the flange part 42 at the lower end of the waterproof cap 40 enables the boundary between the upper surface of the draining rubber 30 and the shaft 22 to be reliably covered with the flange part 42, and the waterproofness is further improved.

In addition, it is possible to effectively prevent water from entering between the draining rubber 30 and the waterproof cap 40, by the labyrinth seal formed by the annular first protrusion 32 protruding upward on the upper surface and the inner peripheral side of the draining rubber 30 and the annular second protrusion 43 protruding downward on the lower surface and the outer peripheral side of the flange part 42 of the waterproof cap 40.

Further, by forming the taper 41b at the upper end of the cylindrical portion 41 of the waterproof cap 40 so as to gradually decrease from the inner peripheral side to the outer peripheral side, dust and water fall along the taper 41b and is less likely to accumulate on the upper end of the waterproof cap 40, which can reduce risk of water entering between the waterproof cap 40 and the shaft 22 from the upper end side of the waterproof cap 40.

Second Embodiment

Figure 8:
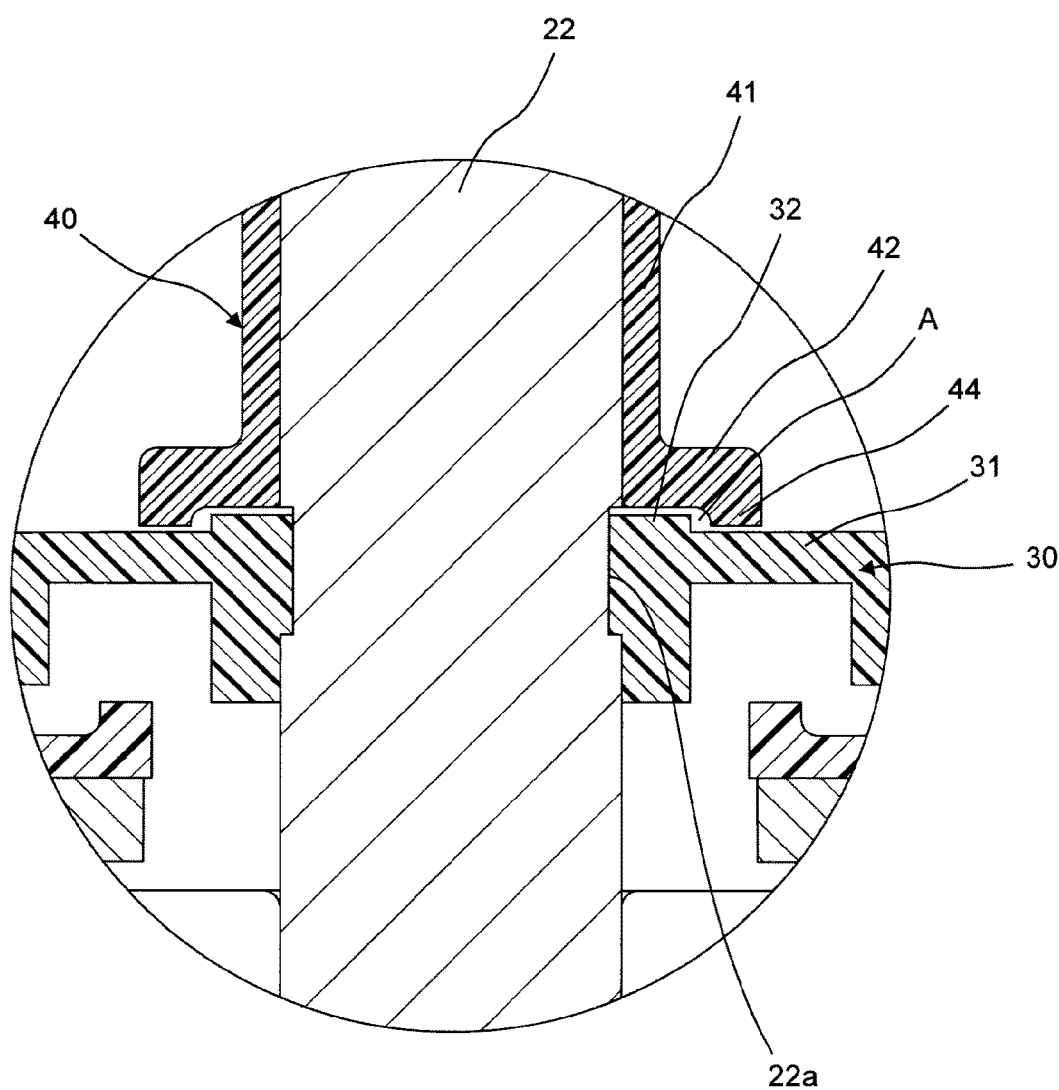
FIG. 8 is an enlarged cross-sectional view of a main part of a fan motor of an outdoor unit using a fan motor waterproof structure of a second embodiment of the present disclosure.

FIG. 8 is an enlarged cross-sectional view of a main part of a fan motor 20 of an outdoor unit using a fan motor waterproof structure of a second embodiment of the present disclosure. The outdoor unit using the fan motor waterproof structure of the second embodiment has the same configuration as the outdoor unit 1 of the first embodiment except for the fan motor waterproof structure, and FIGS. 1 to 3 are incorporated.

In the second embodiment, a lower end face of an annular second protrusion 44 of a waterproof cap 40 is not in contact with an upper surface of a base part 31 of a draining rubber 30, and there is a gap between the annular second protrusion 44 of the waterproof cap 40 and the base part 31 of the draining rubber 30.

As shown in FIG. 8, the fan motor waterproof structure in the second embodiment is different from the fan motor waterproof structure in the first embodiment in that a space A formed between the draining rubber 30 and the waterproof cap 40 is connected to an open space on a radially outer side.

The fan motor waterproof structure of the second embodiment has an effect similar to that of the fan motor waterproof structure of the first embodiment.

In addition, since the space A formed between the draining rubber 30 and the waterproof cap 40 is connected to the open space on the radially outer side, it is possible to cause water having been blocked from entering in the space A between the draining rubber 30 and the waterproof cap 40 to be discharged outside along with rotation of the shaft 22, and to prevent accumulation of water between the draining rubber 30 and the waterproof cap 40.

In the first and second embodiments, the flange part 42 is provided at the lower end of the cylindrical portion 41 of the waterproof cap 40, which is the tubular member, so as to extend outward. However, the flange part may be omitted, and a thickness of the tubular member in the radial direction may be increased, for example, to cover a boundary between the upper surface of the disk-shaped member and the shaft.

Further, in the first and second embodiments described above, the labyrinth seal is formed by providing the annular first protrusion 32 on the draining rubber 30, which is the disk-shaped member, and the annular second protrusion 43 or 44 on the flange part 42 of the waterproof cap 40, which is the tubular member. However, it is also possible to form the labyrinth seal by providing the annular first protrusion protruding upward on the upper surface of the disk-shaped member and at a position facing the outer periphery of the flange part of the tubular member, and providing the annular second protrusion so as to protrude downward on the lower surface and the inner peripheral side of the flange part of the tubular member.

Moreover, the labyrinth seal may be formed by providing two or more of at least one of the annular first protrusion of the disk-shaped member or the annular second protrusion of the tubular member at intervals in the radial direction.

Further, the labyrinth seal by the annular first protrusion of the disk-shaped member and the annular second protrusion of the tubular member may be omitted. In this case as well, it is possible to prevent dust and water from accumulating at the interface between the exposed portion of the shaft and the disk-shaped member.

Further, individual end faces of the draining rubber 30 (the disk-shaped member) and the waterproof cap 40 (the tubular member) facing each other with the space A interposed in between may have a plurality of faces having different heights, and at least one of the plurality of faces of the draining rubber 30 may be located above at least one of the plurality of faces of the waterproof cap 40. This forms a maze between the draining rubber 30 and the waterproof cap 40, which can effectively prevent entering of water between the draining rubber 30 and the waterproof cap 40.

Further, in the first and second embodiments described above, ethylene propylene diene rubber (EPDM) or the like is used as a material for the draining rubber 30, which is the disk-shaped member, and the waterproof cap 40, which is the tubular member. However, the material of the disk-shaped member and the tubular member is not limited to this, and a material having water repellency and weather resistance is preferable.

Further, in the first and second embodiments, the draining rubber 30, which is the disk-shaped member, is fitted and positioned on the annular step part 22a provided on the shaft 22, but the disk-shaped member may be positioned using an E-ring fitted to the shaft.

The foregoing description concerns specific embodiments of the present disclosure; however, the present disclosure is not limited to the first and second embodiments, and various modifications and variations may be made within the scope of the present disclosure.

What is claimed is:
1. A fan motor waterproof structure comprising:
   a fan motor arranged with a shaft projecting upward from a motor body, the shaft being configured to be attached to a fan;
   a disk-shaped member fitted to an outside of a projecting portion of the shaft of the fan motor on a motor body side; and
   a tubular member disposed on or above the disk-shaped member and press-fitted on an outer periphery of the shaft, the tubular member covering a boundary between an upper surface of the disk-shaped member and the shaft,
   a flange part being provided at a lower end of the tubular member, an annular first protrusion being provided that protrudes upward on an upper surface and an inner peripheral side of the disk-shaped member, an annular second protrusion being provided that protrudes downward on a lower surface and an outer peripheral side of the flange part of the tubular member, and a labyrinth seal being formed by the annular first protrusion of the disk-shaped member and the annular second protrusion of the tubular member.

2. The fan motor waterproof structure according to claim 1, wherein a first space is formed between the disk-shaped member and the tubular member, and the first space is connected to a second open space on a radially outer side.

3. The fan motor waterproof structure according to claim 1, wherein a taper is formed at an upper end of the tubular member to gradually decrease from an inner peripheral side toward an outer peripheral side.

* * * * *